July 22, 1947.　　G. C. ARMSTRONG　　2,424,297
OVERLOAD RELAY
Filed Nov. 20, 1943　　2 Sheets-Sheet 1
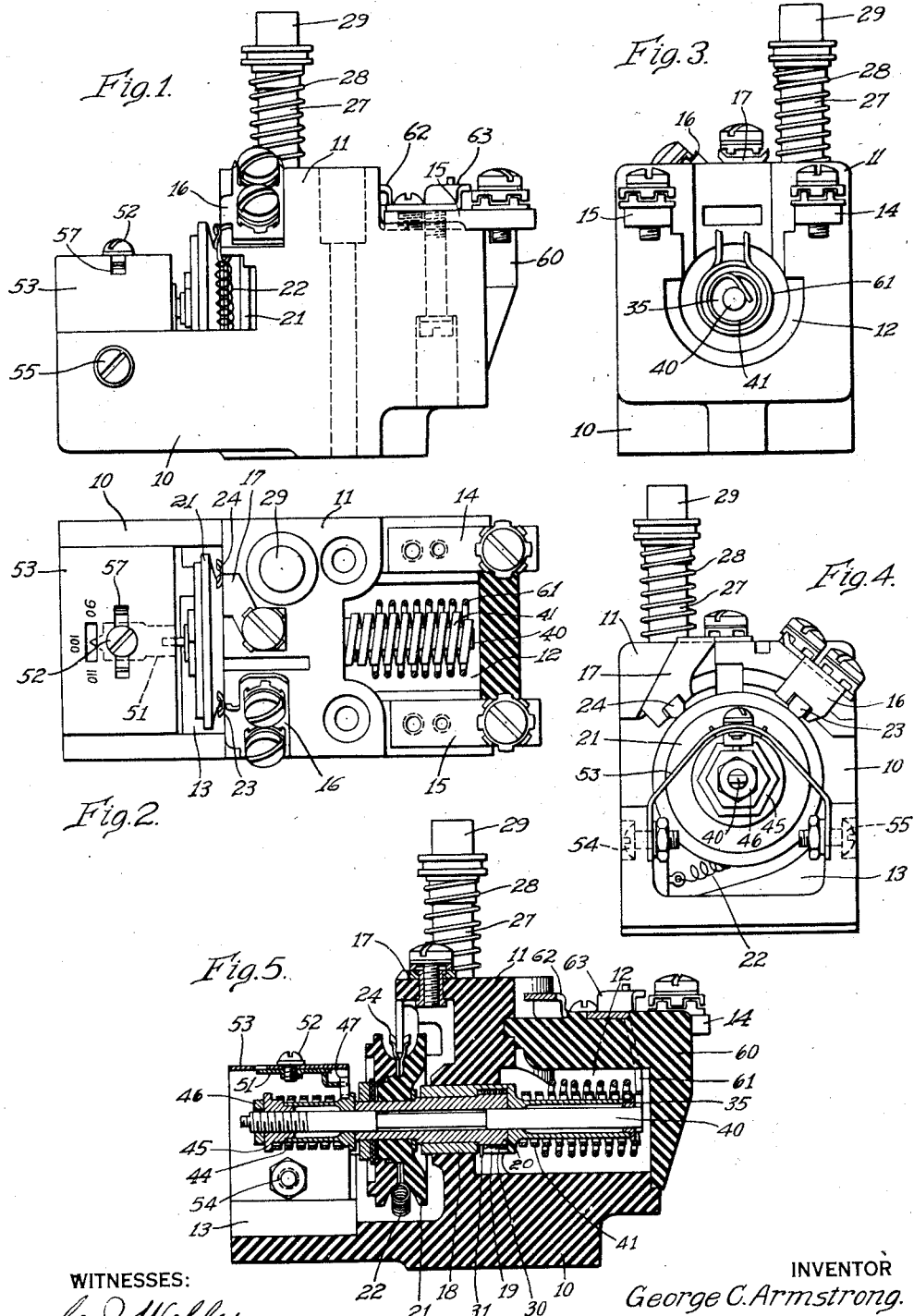
WITNESSES:
INVENTOR
George C. Armstrong.
BY
Paul E. Friedemann
ATTORNEY July 22, 1947.　　　G. C. ARMSTRONG　　　2,424,297
OVERLOAD RELAY
Filed Nov. 20, 1943　　　2 Sheets-Sheet 2
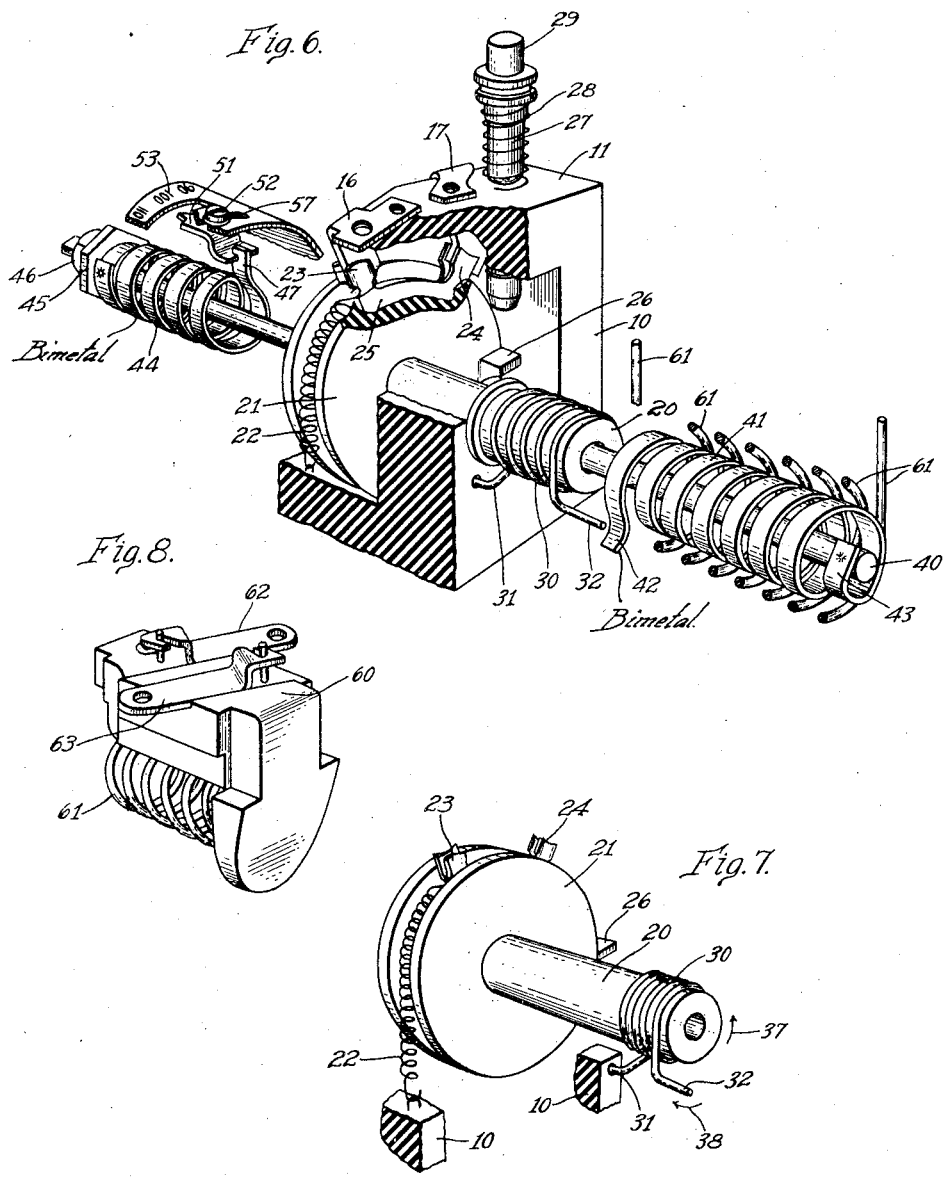
WITNESSES:
C. J. Weller.
Curt M. Avery
INVENTOR
George C. Armstrong.
BY
Paul E. Friedemann
ATTORNEY Patented July 22, 1947

2,424,297

UNITED STATES PATENT OFFICE 2,424,297

OVERLOAD RELAY

George C. Armstrong, Forest Hills, Pa., assignor to Westinghouse Electric Corporation, East Pittsburgh, Pa., a corporation of Pennsylvania Application November 20, 1943, Serial No. 511,045

12 Claims. (Cl. 200—122)

My invention relates generally to electrically actuated devices in which a spring biased movable member is normally prevented from following its bias and is released electrically upon the occurrence of a given operating condition and, in one of its particular aspects, deals especially with thermally operating electric overload relays of the just mentioned type.

It is an object of the invention to provide such devices with latching or clutching means of improved design and operation. More particularly, the invention aims at devising releasable clutching means of great reliability, sensitivity, and accuracy of operation which are also distinguished by extremely small space requirements.

It is also an object to design a device of the type above-referred to, in such a manner that the releasable latching or clutching means act along the entire periphery of the movable switch to be latched so as to be capable of exerting a considerable locking force thereon; and it is further aimed at achieving this result while requiring only a slight tripping movement of the clutch or latch means and a slight tripping force for effecting the release of the movable switch member.

Another object of my invention is to provide a relay or other device of the type mentioned which is capable of withstanding extremely high impact forces or vibrations such as occurring under shock, and which does not tend to perform uncontrolled operations when exposed to such shock forces. In particular, it is intended by this invention to furnish a relay that, when exposed to shock, does not release its contact member or to otherwise change the contact position occupied previous to the shock, and it is a further object to attain such safety of operation in conjunction with the objects mentioned in the preceding paragraphs of this specification.

An object is also the provision of a device which is shock-proof in the manner just mentioned by virtue of inherent mechanical properties, that is, without necessitating the use of additional shock or vibration responsive latching devices.

A still further object of the invention is to devise a contactor, relay, or the like apparatus that is protected from undesired operation due to shock or vibration but nevertheless capable of intentional or controlled operation during the periods of persistence of shock or vibratory forces.

In other aspects, my invention aims at a construction of an electric overload relay which in conjunction with one or several of the aforementioned objects is also distinguished by insensitivity to changes in ambient temperature and affords adjusting its datum value of release within wide limits of selective overload currents.

In order to achieve these objects, my invention requires the use of a helical clutching spring which is frictionally seated on a rotatable spring-biased member so as to normally prevent its rotation in the winding-up or tightening direction of the spring while permitting a rotation in the opposite, i. e. unwinding direction, electrically operating control means being provided for loosening the frictional grip of the clutching spring when a release of the rotatable member for motion in the tightening direction is required.

The invention, in its general aspects, involves also a rotational symmetrical design of the rotatable member and the other mechanism parts coacting with the helical clutching spring so as to balance the mechanism statically and dynamically.

According to another feature of the invention, a helical clutching spring as mentioned above is associated with a bimetal winding which, in response to given changes in temperature, entrains an end of the clutch spring in the unwinding direction to effect the release of the clutch.

In accordance with another feature of my invention, a second bimetal winding is provided for compensating the effects of ambient temperature changes, and this second spring is arranged coaxially and in mechanical series-connection with the first-mentioned bimetal and acts in opposition thereto, only one of the two bimetals being thermally associated with a heater for controlling the clutch operation.

In order to elucidate these and other features and objects of my invention, reference is had in the following to the apparatus illustrated in the drawing.

All figures of the drawing refer to the same embodiment of an ambient-temperature compensated single-pole over-load relay suitable for alternating-current or direct-current service and applicable, for instance, to controllers and motor starters, including apparatus for duty on board of ship or other places where shocks and vibrations are apt to be transmitted to the relay.

More specifically, Fig. 1 is a side elevation, Fig. 2 a plan view, Fig. 3 an end view seen from the right of Figs. 1 and 2, Fig. 4 an end view seen from the opposite side, and Fig. 5 an axial section through the horizontal axis of Fig. 2. Fig. 6 is a perspectve and schematic view of the bimetal, clutch and contact assembly of the relay showing the shaft of these parts diagrammatically extended and the whole assembly somewhat exploded for explanatory reasons. Fig. 7 shows in diagrammatic perspective the clutch and movable contact member, and Fig. 8 is a true perspective showing of an exchangeable heating unit appertaining to the relay.

Referring to the figures, numeral 10 denotes a molded base consisting preferably of an asbestos fiber material which resists heat and will not shatter when subjected to high impact shock. The base 10 has a raised central portion 11 and has two cavities 12 and 13 at different sides, respectively, of the raised portion. The two cavities are open towards the top as viewed in Fig. 1 and the axial ends respectively of the molded body.

Two contact terminals 14 and 15 are firmly secured to the body 10 on top of its wall portions bordering the cavity 12. These terminals are provided with binding screws and have threaded openings for the attachment of a heating unit to be described in a later place. The leads carrying the current to be controlled by the overload relay are to be attached to the binding screws of the terminals 14 and 15.

Two contact pieces 16 and 17 are rigidly attached to the raised portion 11 of the base. Each of these contact pieces is of substantially angular shape and has one of its legs extending towards the bottom of the cavity 13 and arranged in a common plane with the corresponding leg of the other contact piece. The two downwardly extending legs form the stationary contacts of the contact device of the relay. The contact pieces 16 and 17 are provided with binding screws or the like terminals for attaching thereto the leads of an auxiliary or pilot circuit serving, as a rule, to actuate a contactor which, in turn, interrupts or reduces the load current applied to the terminals 14 and 15. This way of controlling a contactor of the main load circuit is known and customary as such and does not form a part of the relay or of the invention proper. Therefore, these external circuit connections are not illustrated in the drawing.

A metal bushing 18 (Fig. 5) serving as a bearing for the rotation of elements described hereinafter is firmly secured in an axial bore of the central portion 11 of the base 10.

A hollow shaft member 20, hereinafter called a quill shaft, is journalled in the bushing 18 for free rotation (Fig. 5). This quill shaft forms part of a movable contact assembly which is separately illustrated in the schematic diagram of Fig. 7. According to this figure, the quill shaft 20 is rigidly secured to a rotor 21 of insulating material. A helical extension spring 22 is connected between the rotor 21 and the base 10 in order to bias the rotor 21 and quill shaft 20 for rotation in the direction of the arrow 37. Two pairs of contacts denoted by 23 and 24 are firmly secured to the rotor 21 and interconnected by means of a metal strip 25 (Fig. 6). When in the position illustrated, these contacts establish an electric connection between the above-mentioned stationary contacts 16 and 17. It will be seen from Fig. 6 that the spring 22 tends to move the rotor 21 and its contacts 23 and 24 out of the illustrated closing position into the contact interrupting position. Such interrupting motion is normally prevented by a locking or clutching device to be described hereinafter.

The rotor 21 has a lug 26 (Figs. 6 and 7) for cooperation with a reset plunger 27 which is mounted in the raised portion 11 of the insulating base for reciprocation in a direction tangential to the rotor. The plunger 27 is provided with a coiled compression spring 28 and carries a push button 29. The spring 28 tends to move the plunger and push button away from the base portion 11 so as to maintain these parts in the position shown in Figs. 1 and 3 through 7 of the drawings. It will be apparent from Fig. 6 that when the rotor 21 is released for motion in the direction of the bias produced by spring 22, the lug 26 will move close to the lower end of the plunger 27. Hence, when the rotor is in the circuit interrupting position, the actuation of push button 29 will cause the plunger 27 to abut against lug 26 and to return the rotor 21 into the circuit closing position shown in Fig. 6.

The means for locking the rotor 21 in the illustrated closing position comprise a helical clutching spring 30 which is closely wound around the quill shaft 20 and has one of its ends, denoted by 31 in fixed engagement with the base 10. While this engagement is shown in a simplified manner in Figs. 6 and 7, its actual design is apparent from Fig. 5. According to the latter figure, the end 31 of the clutching spring 30 engages a slot 19 of the stationary bushing 18. The spring 30 is secured in proper position between the quill shaft 20 and the bushing 18 by a cover plate and sleeve 35 which is mounted on the bushing 18. This design permits an easy assembly of the quill shaft and clutch spring with the stationary parts of the relay.

Reverting to Figs. 6 and 7, it is essential that the clutch spring 30 surround the quill shaft 20 so tightly that the quill shaft is permitted to rotate freely only in the reset direction, i. e. opposite to the biasing tendency of the spring 22 indicated by the arrow 37. Any attempt to rotate the quill shaft in the opposite or gripping direction will tend to wrap the clutch spring 30 more tightly on the quill shaft 20. Hence, a circuit interrupting motion of the rotor 21 is normally prevented by the clutching action of the spring 30. The clutching force is effective around the entire periphery of the quill shaft. Hence, the rotor is safely locked in position although the space requirements of a clutch of this type are extremely small, as compared with the locking device heretofore customary in comparable relays.

In order to release the grip of spring 30, its free end 32 is to be rotated in the direction indicated in Fig. 7 by the arrow marked 38. Since the other end of spring 30 is held stationary due to its engagement with the slot 19 of the stationary bushing 18, the just-mentioned rotation of end 32 has the effect of unwinding the spring 30 from the quill shaft and releases the gripping action so that the quill shaft becomes free to rotate in either direction. Consequently, when the trip end 32 of spring 30 is properly rotated while the rotor is in the contact closing position according to Fig. 6, the spring 22 will become effective and turn the rotor 21 towards the interrupting position. The arrangement of the clutching spring 30 in an annular space between the quill shaft 20 and the stationary bushing 18 axially confined by the sleeve 35 (Fig. 5) ensures a free and reliable tripping action while minimizing the travel required for the release of the clutch.

A thermostatic assembly is provided for controlling the just-mentioned release action of the clutch spring 30. This assembly includes a shaft 40, hereinafter called the compensating shaft, which traverses the bore of the quill shaft 20 and extends into both cavities 12 and 13. The seat of the compensating shaft in the quill shaft is sufficiently loose to permit both shifts a rotation relative to each other. A helical bimetal strip 41 surrounds the compensating shaft 40 within the cavity 12. One end 42 of the strip is bent away and lies close to the free end 32 of the clutch spring 30 (Fig. 6). The other end of the bimetal strip is firmly secured at 43 to the compensating shaft 40. A second bimetallic winding 44 is arranged concentrically to the quill shaft 40 within or above the cavity 13 and has one end firmly attached to an abutment member 45, which, in turn, is secured to the compensating shaft 40 by means of a locking nut 46. The nut permits changing the angular position of the abutment 45 relative to the shaft 40. The other end 47 of the strip 44 is straddled by a bifurcated portion of an adjusting plate 51 which, by means of a setscrew 52, is attached to a stirrup-shaped cover plate 53. Plate 53 is firmly secured to base 10 by means of screws 54 and 55 and covers the top side of cavity 13. The adjusting plate 51 forms a pointer for cooperation with indicia marked on the cover plate 53. Adjusting the member 51 along the slot 57 of plate 53 has the effect of changing the setting of the relay and hence permits a variation within limits of the load magnitude at which the relay is supposed to interrupt the load current. The function of the just-mentioned setting device will be understood from the following explanation of the operation of the thermostatic assembly.

The two bimetal strips 41 and 44 are arranged for opposite action. That is, an increase in temperature acting simultaneously on both strips causes one of them to rotate its end in one direction, for instance clockwise, while the other strip under the same thermal influence will move its free end in the opposite, i. e. counterclockwise direction. The rotation thus produced at the shaft-connected end of the strip 44 is transmitted through the abutment member 45 and the shaft 40 to the end 43 of the bimetal strip 41. Consequently, this end 43 will move in the opposite direction to the thermoresponsive motion of the free trip end 42. As a result, the trip end 42 will maintain its position relative to the trip end 32 of the clutch spring 30. By virtue of this compensating cooperation of the two bimetal strips 41 and 44, a change in ambient temperature will not affect the setting or the operation of the relay because such change affects both strips and hence is compensated by the assembly.

In order to obtain the required response of the relay to overload currents, one of the bimetal strips is exposed to the effect of a heating unit which is energized in dependence upon the current to be controlled by the relay. Accordingly, the helical bimetal strip 41 in cavity 12 is surrounded by a likewise helical heating coil 61 which extends substantially coaxial to the bimetal. The heating coil 61 is firmly mounted on a carrier 60 of heat resistant, for instance ceramic, insulating material (Fig. 8) and has its terminals connected to two metal strips 62 and 63 which project laterally of the carrier 60. The carrier 60 has a substantially angular cross-section and is so shaped that it covers the open top side and front side of the cavity 12 when properly assembled with the base 10 of the relay (Fig. 5). For the sake of clarity only the heating coil 61 is shown in Figs. 2 and 3, the rest of the heating unit being removed from the relay. The heating unit is likewise omitted from the showing in Fig. 1. However, its design and location relative to the other elements of the relay are fully apparent from Figs. 5 and 8. When assembled with the relay, the projecting ends of the terminal pieces 62 and 63 (Fig. 8) are in registry with threaded openings of the terminals 14 and 15 (Fig. 2), and hence can be firmly secured to these terminals by means of connecting screws (not illustrated). In this assembled condition, the load current to be controlled passes from terminal 14 through heating coil 61 to the terminal 15. The current generates heat proportional to the square of its intensity. Under the influence of this heat, the main bimetal strip 41 will expand and its trip end 42 (Fig. 6) will move towards the trip end 32 of the clutch spring 30. Up to rated load currents, the movement of the trip end 42 is insufficient to engage the end 32 of the spring. On overload currents, however, the generated heat is sufficient to rotate the end 42 of the bimetal strip against the spring end 32 and to entrain this end so as to produce the aforementioned release effect.

After the relay has operated on an overload, it can be reset by depressing the push button 29, provided the main bimetal 41 has cooled sufficiently to disengage its trip end from the trip end of the clutch spring.

It will now be understood that if the thermostatic assembly were not self-compensating due to the presence of two counteracting bimetal members, an increase in ambient temperature would tend to reduce the distance between the tripping ends 42 and 32 so that the relay would trip at a lower current than the one to which the setting device is adjusted. Conversely, any decrease in ambient temperature would require a higher current than desired for tripping the relay. Such variations, however, are prevented by the fact that the travel of the bimetal tripping end 42 is automatically adjusted so that its distance from the spring end 32 remains approximately constant for a wide range of ambient temperature.

It will further be clear from the foregoing description that the distance between the tripping ends 32 and 42 can be varied by changing the position of the setscrew 52 along the slot 57. An increase in trip distance between ends 32 and 42 will require a correspondingly higher current. This affords an easy and accurate setting of the relay, for instance, between 90% and 110% of the rated overload value. If the heating unit fails to cause tripping at the intended overload magnitude, a differently rated heating unit can be substituted. A series of heating units properly graduated so as to cover a large range of rated load values may be provided by the manufacturer of the relay so that it can be adapted for a variety of control purposes merely by selecting a properly rated heating unit. For very large current intensities, the heating winding may consist of a single turn of correspondingly large cross section. The same relay mechanism can thus be used for rated loads between less than ½ amp. to values above 120 amps. per instance.

The above described relay is shockproof without requiring additional shock-responsive latching devices or the like auxiliary elements. The low sensitivity to shocks or vibrations is due to the fact that the movable contact parts as well as the clutch means and the thermostatic parts cooperating therewith are all substantially symmetrical to the axis of rotation and are balanced statically and dynamically with respect to this axis and to such an extent that when the relay base is subjected to shock or vibration, all forces produced thereby in the movable relay parts are substantially compensated and hence ineffective. The balanced and very low inertia of the spring clutch, and the multiple gripping turns enable it to withstand extremely high rates of acceleration during shock without releasing its grip. However, while the relay is protected from unintended operation due to shock forces, any overload occurring during the persistence of shock or vibrations will continue to effect a proper interrupting operation.

It will further be understood, particularly from Figure 6, that the interruption motion can also be released independently of an overload. To this end, the compensating shaft 40 is turned clockwise (Fig. 6). This has the effect of bringing the trip end 42 of the bimetal strip 41 in engagement with the trip end 32 of the clutch spring 30 so that the spring is acted upon in the same manner as upon the occurrence of overload. For testing purposes, nut 46 can be loosened, or the bimetal 43 can be released by removing the cover 53 or the pointer 47. Each of these measures will release the compensating shaft 40 for rotation so that a slight rotary force can be applied to the flattened left end of the shaft by using pincers or another suitable tool.

I am aware of the fact that relays according to my invention can be modified in various respects by those skilled in the art on the basis of my present disclosure without departing from the essential objects and characteristics as set forth in the foregoing. Therefore, I wish this specification to be understood as illustrative and not in a limiting sense.

I claim as my invention:

1. A relay comprising, in combination, a supporting structure, a contact assembly having a hollow shaft rotatably mounted in said structure, a spring attached between said structure and said assembly for biasing said shaft for rotation, a helical clutching spring seated on said shaft for gripping it so as to normally prevent said rotation and having one end engaging said structure, a bimetal winding arranged coaxially to said shaft and having one end arranged for engaging the other end of said clutching spring, an inner shaft coaxially traversing said hollow shaft and being connected with the other end of said winding, another bimetal winding arranged for compensating changes in ambient temperature and arranged coaxially to said shafts, said other winding having one end connected to said inner shaft and the other end connected to said structure for temperature-responsive motion in opposition to that of said first winding, and electric heating means adjacent to said first winding for heating it in order to cause it to unwind said clutching spring so as to release said hollow shaft for rotation under the force of said biasing spring.

2. A relay comprising an insulating base having a cavity open at two adjacent rectangularly located surfaces of the base, a structure provided with contact means and being rotatably mounted on said base and biased for rotation in a given direction, a helical clutching spring frictionally engaging said structure for normally preventing its rotation in said direction, a bimetal member disposed concentrically to said spring for engaging said spring in order to unwind it so as to release said structure, said bimetal being arranged in said cavity, a refractory and insulating support exchangeably attached to said base and having angular shape so as to cover said cavity, and a heating winding mounted on said support so as to surround said bimetal when said support is attached to said base.

3. A relay comprising an insulating base, a rotatable member journalled in said base and biased for rotation in a given direction, a helical clutching spring frictionally engaging said member for normally preventing its rotation in said direction, a thermoresponsive device including a bimetal winding having one end arranged for transmittal of motion to said spring in the unwinding direction of said spring in order to release said member for said rotation, electric means for heating said thermoresponsive device, bracket means mounted on said base, and adjusting means having an element movably mounted on said bracket means and engaging the other end of said bimetal winding so as to permit adjusting the position of said other end relative to said base in order to set the datum value of electric current in said heating means required for causing the release of said member.

4. A relay comprising, in combination, a supporting structure, a contact assembly having a shaft rotatably mounted in said structure, a spring attached between said structure and said assembly for biasing said shaft for rotation, a helical clutching spring seated on said shaft for gripping it so as to normally prevent said rotation and having one end engaging said structure, a bimetal winding engageable with the other end of said spring for moving, when heated, said end in the peripheral direction of said spring so as to unwind said spring in order to release said shaft, and electric heating means associated with said bimetal winding.

5. A contact device comprising, in combination, a supporting structure, a contact assembly having a shaft rotatably mounted in said structure, a spring attached between said structure and said assembly for biasing said shaft for rotation, a helical clutching spring frictionally seated on said shaft so as to have the tendency to prevent said rotation and having one end engaging said structure, two helical bimetal windings arranged for moving one of their respective ends peripherally when heated, one of said windings having one end engageable with the other end of said clutching spring so as to entrain when heated said other end of said clutching spring and in order to unwind said clutching spring, said other bimetal winding having one end connected to the other end of said first winding and having its other end attached to said structure, said windings acting in opposition to each other under ambient temperature so as to remain ineffective as regards said clutching spring when said temperature changes, and electric heating means associated with only one of said windings for causing it to unwind said spring in order to release said shaft for rotation due to said biasing spring.

6. An overload relay comprising, in combination, contact means having a rotatable member biased for motion in the contact opening direction and having a peripheral seat surface, a helical clutching spring surrounding and frictionally engaging said surface for holding said member in contact closing position against its bias, a helical bimetal surrounding said spring and being arranged for causing when heated one of its ends to perform rotary motion in the unwinding direction of said spring, said bimetal having said end engageable with said spring for causing said spring to release said member, and a current responsive heating coil surrounding said bimetal for rendering it effective in response to overload.

7. In a relay having a supporting base, a structure provided with contact means and being rotatably mounted on said base and biased for rotation in a given direction, clutch means normally engaging said structure for preventing said rotation, and electric control means mechanically engaging said clutch means for releasing it from said structure, said clutch means, and control means being each substantially rotation-symmetrical and arranged so as to surround the geometric axis of said structure concentrically and being substantially balanced statically and dynamically as regards said axis so as to be prevented from operating due to the application of shock and vibration to said base.

3. A relay having a supporting base, a structure provided with contact means and being rotatably mounted on said base and biased for rotation in a given direction, a clutching spring normally engaging said structure frictionally for preventing said rotation, and thermoresponsive bimetal means for engaging said spring in order to release it from said structure, said structure, spring and bimetal means being substantially rotation-symmetrical and arranged so as to surround the geometric axis of said structure concentrically and being substantially balanced statically and dynamically as regards said axis so as to be prevented from operating due to shock and vibration acting on said base.

9. A relay comprising an insulating base, a rotatable member journalled in said base and biased for rotation in a given direction, a helical clutching spring frictionally engaging said member for normally preventing its rotation in said direction and having one end in engagement with said base, a bimetal member disposed concentrically to said member and spring and having one of its ends engageable with the other end of said spring and movable, in response to heat, in the peripheral unwinding direction of said spring in order to cause said spring to release said member, an electric heating winding, and an insulating support exchangeably mounted on said base and carrying said winding so as to hold it substantially concentrically to said bimetal member when said support is attached to said base.

10. An electric contact device, comprising a supporting structure, a contact control member rotatable on said structure between two angular positions, said member being biased toward one of said positions and having a peripheral seat surface, a multiple-turn helical clutching spring frictionally seated on said surface for preventing said member from rotating toward said one position while permitting its rotation toward the other position, said spring having one end held stationary by said structure and the other end disposed to be moved in the unwinding direction of the spring, a helical bimetal winding arranged coaxially to said member and spring and having one end secured in an adjustable reference position so that the other end of said winding performs rotary motion about the axis of said winding in response to temperature acting on said winding, said other end of said winding being arranged relative to said other end of said spring for causing the latter to move in said unwinding direction when said temperature exceeds a value determined by said reference position.

11. An electric contact device, comprising a supporting structure, an element disposed on said structure and being movable relative thereto, a contact control member rotatable on said structure between two angular positions, said member being biased toward one of said positions and having a peripheral seat surface, a multiple-turn helical clutching spring frictionally seated on said surface for preventing said member from rotating toward said one position while permitting its rotation toward the other position, said spring having one end held stationary by said structure and the other end disposed to be moved in the unwinding direction of the spring, a helical bimetal winding arranged coaxially to said member and spring and having one end secured to said element so that the other end of said winding performs rotary motion about the axis of said winding and relative to said element in response to the temperature of said winding, a second helical bimetal winding connected between said structure and said element for moving the latter relative to said structure in response to the temperature of said second winding, and electric heating means associated with only one of said two windings.

12. An electric circuit control device, comprising a supporting structure, an element revolvably disposed on said structure, a contact control member rotatable on said structure coaxially to said element between two angular positions, said member being biased toward one of said positions and having a peripheral seat surface, a multiple-turn helical clutching spring frictionally seated on said surface for preventing said member from rotating toward said one position while permitting its rotation toward the other position, said spring having one end held stationary by said structure and the other end disposed to be moved in the unwinding direction of the spring, a helical bimetal winding arranged coaxially to said member and spring and having one end secured to said element so that the other end of said winding performs rotary motion relative to said element and about the axis of said element in response to the temperature of said winding, a second helical bimetal winding having one end connected to said element and the other end adjustably secured to said structure for revolving said element relative to said structure in dependence upon the temperature of said second winding, means for varying the adjustment of said other end of said second winding, and electric means for heating only one of said two windings in response to a condition of the circuit to be controlled.

GEORGE C. ARMSTRONG.

REFERENCES CITED

The following references are of record in the file of this patent:

UNITED STATES PATENTS

| Number | Name | Date |
|---|---|---|
| 1,877,976 | Rosenfeld et al. | Sept. 20, 1932 |
| 2,305,446 | Saul | Dec. 15, 1942 |
| 639,688 | Robertson | Dec. 19, 1899 |
| 1,952,040 | Frank | Mar. 20, 1934 |
| 1,842,958 | Chapman et al. | Jan. 26, 1932 |
| 2,083,509 | Schmidt | June 8, 1937 |